(12) United States Patent
Okamoto et al.

(10) Patent No.: US 9,620,805 B2
(45) Date of Patent: Apr. 11, 2017

(54) SOLID OXIDE FUEL CELL

(71) Applicant: NGK INSULATORS, LTD., Nagoya-shi, Aichi (JP)

(72) Inventors: Taku Okamoto, Nagoya (JP); Hiroshi Hayashi, Nagoya (JP); Takashi Ryu, Nagoya (JP); Toshihiro Yoshida, Nagoya (JP); Yuto Yamada, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 1185 days.

(21) Appl. No.: 13/676,188

(22) Filed: Nov. 14, 2012

(65) Prior Publication Data
US 2013/0230788 A1    Sep. 5, 2013

(30) Foreign Application Priority Data

Nov. 24, 2011 (JP) ................................. 2011-256515
Nov. 12, 2012 (JP) ................................. 2012-248420

(51) Int. Cl.
*H01M 8/24* (2016.01)
*H01M 8/2465* (2016.01)
(Continued)

(52) U.S. Cl.
CPC ....... *H01M 8/2465* (2013.01); *H01M 4/8652* (2013.01); *H01M 4/8673* (2013.01);
(Continued)

(58) Field of Classification Search
CPC ............. H01M 8/0215; H01M 8/0217; H01M 8/0219; H01M 8/0228; H01M 8/023;
(Continued)

(56) References Cited

U.S. PATENT DOCUMENTS 5,500,307 A * 3/1996 Anzai ................. H01M 8/0625
                                                       429/465
6,692,855 B1 * 2/2004 Aizawa ............... H01M 4/8621
                                                       429/479
(Continued)

FOREIGN PATENT DOCUMENTS

| EP | 1 788 652 A1 | 5/2007 |
| EP | 1 788 653 A1 | 5/2007 |
| JP | 2005-135729 A | 5/2005 |

OTHER PUBLICATIONS

Machine translation of Tsuru JP 2006-310090, Nov. 2006.*
Extended European Search Report of the corresponding European Application No. 12192776.8 issued on Mar. 19, 2013.

*Primary Examiner* — Ula C Ruddock
*Assistant Examiner* — Lisa S Park
(74) *Attorney, Agent, or Firm* — Global IP Counselors, LLP

(57) ABSTRACT

A solid oxide fuel cell includes a first cell, a second cell and an interconnector. The first cell and the second cell respectively include an anode containing NiO and $CaZrO_3$, a cathode, and a solid electrolyte layer disposed between the anode and the cathode. The interconnector is connected to the anode of the first cell and the current collector of the second cell. The interconnector contains $LaCaCrO_3$. The molar ratio of Ca to Zr in the anode is greater than 1.0.

16 Claims, 3 Drawing Sheets

(51) Int. Cl.
*H01M 8/1213* (2016.01)
*H01M 4/86* (2006.01)
*H01M 8/0217* (2016.01)

(52) U.S. Cl.
CPC ....... *H01M 8/0219* (2013.01); *H01M 8/1213* (2013.01); *Y02E 60/521* (2013.01); *Y02E 60/525* (2013.01)

(58) Field of Classification Search
CPC ............ H01M 8/0236; H01M 8/0241; H01M 8/0243; H01M 8/0245; H01M 8/1004; H01M 8/1009; H01M 8/249; H01M 2008/1293; H01M 4/8647; H01M 4/9066; H01M 4/9025; H01M 4/9033; H01M 8/2465; H01M 8/1213; H01M 4/8673; H01M 4/8652; Y02E 60/521; Y02E 60/525

See application file for complete search history.

(56) References Cited

U.S. PATENT DOCUMENTS

2003/0224240 A1* 12/2003 Yamashita .......... H01M 8/1226
429/465
2004/0229031 A1* 11/2004 Gell ...................... B82Y 30/00
428/323
2011/0198216 A1* 8/2011 Larsen ................ H01M 4/8663
204/242

* cited by examiner

SOLID OXIDE FUEL CELL

CROSS-REFERENCE TO RELATED APPLICATIONS

This application claims priority to Japanese Patent Application No. 2011-256515 filed on Nov. 24, 2011 and Japanese Patent Application No. 2012-248420 filed on Nov. 12, 2012. The entire disclosure of Japanese Patent Application No. 2011-256515 and Japanese Patent Application No. 2012-248420 is hereby incorporated herein by reference.

BACKGROUND

Technical Field

The present invention relates to a solid oxide fuel cell.

Description of the Related Art

A solid oxide fuel cell (SOFC) includes a plurality of fuel cells that consists of an electrolyte layer, a cathode and an interconnector electrically connecting between the anode of a fuel cell and the cathode of another fuel cell.

Japanese Patent Application Laid-Open No. 2005-135729 discloses a fuel cell that includes a support substrate, two cells formed on the support substrate, and an interconnector configured to create an electrical connection between the two cells. Japanese Patent Application Laid-Open No. 2005-135729 discloses the interconnector that consists of a first layer configured with $CaZrO_3$ (referred to as CZO below) and a second layer configured with $LaCaCrO_3$ (referred to as LCC below).

SUMMARY

However, the configuration in Japanese Patent Application Laid-Open No. 2005-135729 is associated with the problem that the interconnector cannot have a sufficiently dense configuration. As a result of diligent investigation by the present inventors, the insight was gained that the reason was due to the fact that Ca (calcium) that is included as a sintering agent in LCC diffuses into the anode during firing of the interconnector. Although the cause has not been determined, it is considered that it is probably due to Ca forming a solid solution with NiO in the anode.

The present invention is based on the above insight, and has the object of providing a solid oxide fuel cell that increases the density of the interconnector.

A solid oxide fuel cell includes a first cell, a second cell and an interconnector. The first cell and the second cell respectively include an anode containing NiO and $CaZrO_3$, a cathode, a solid electrolyte layer disposed between the anode and the cathode, and a current collector disposed on the cathode. The interconnector is connected to the anode of the first cell and the current collector of the second cell. The interconnector contains $LaCaCrO_3$. The molar ratio of Ca to Zr in the anode is greater than 1.0.

The present invention enables provision of a solid oxide fuel cell that increases the density of the interconnector.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Configuration of Fuel Cell 1

Figure 1:
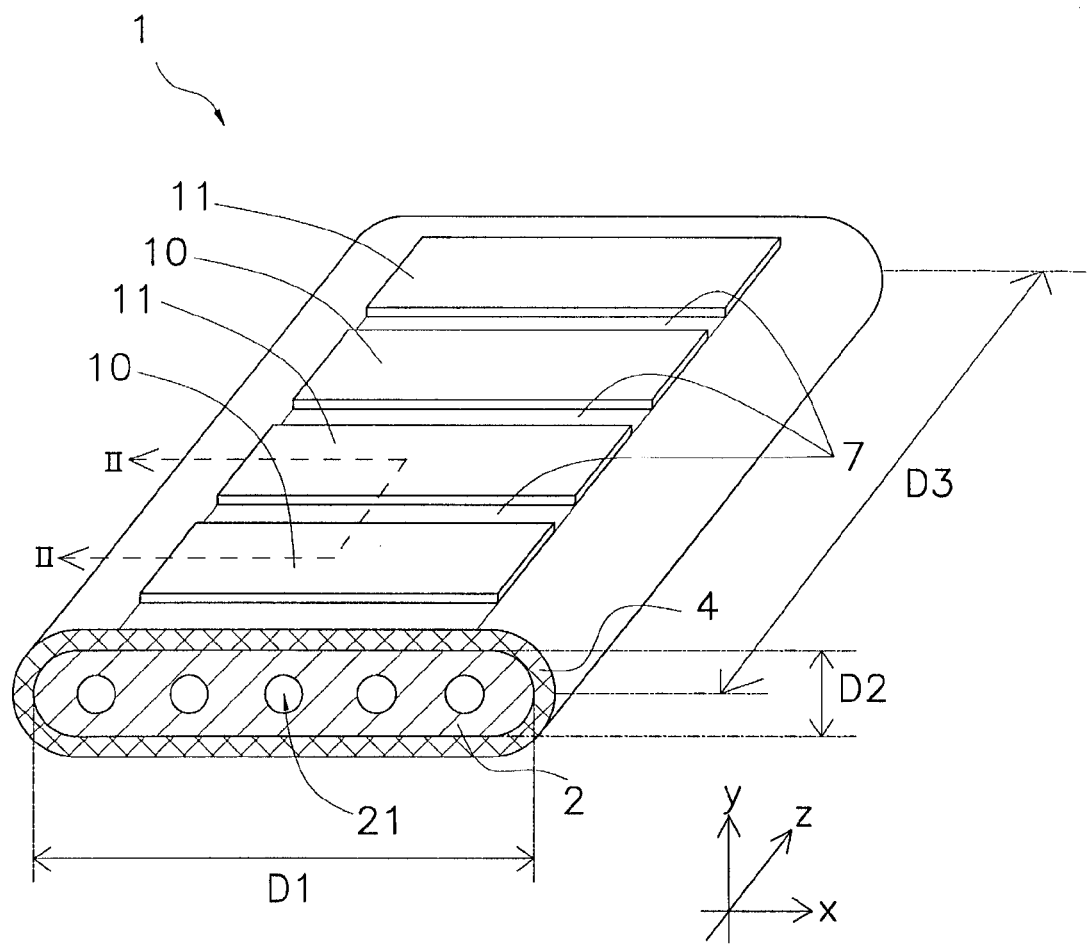
FIG. 1 illustrates a cross sectional view of one embodiment of a segmented-in-series solid oxide fuel cell.
Figure 2:
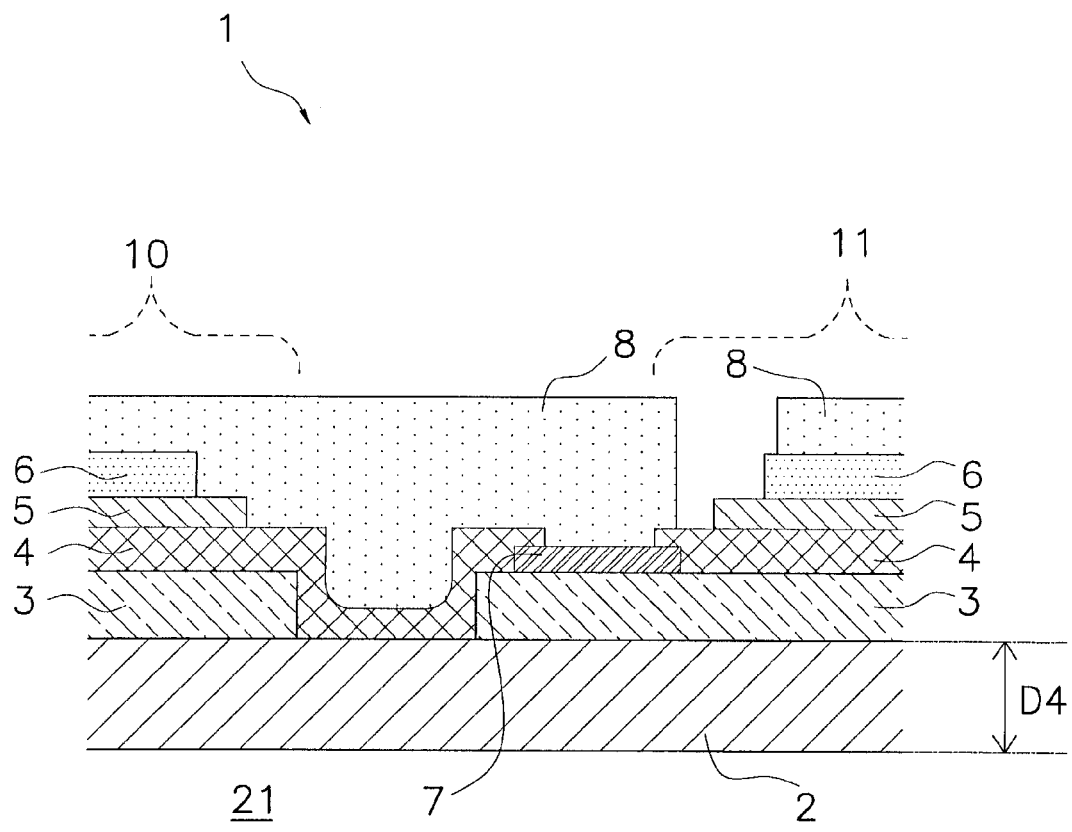
FIG. 2 is a longitudinal sectional view along the line II-II of the segmented-in-series solid oxide fuel cell illustrated in FIG. 1.

As illustrated in FIG. 1 and FIG. 2, a segmented-in-series solid oxide fuel cell 1 according to the present embodiment (hereinafter simply referred to as "fuel cell") includes a support substrate 2, a first solid oxide fuel cell (hereinafter simply referred to as "cell") 10, and a second cell 11. The first cell 10 and the second cell 11 respectively include an anode 3, an electrolyte layer 4, a barrier layer 5, a cathode 6, an interconnector 7, and a current collector 8. In FIG. 1, the current collector 8 is not illustrated to simplify the description.

The support substrate 2 is flat and elongated in one direction (z axis direction). The support substrate 2 is configured with a porous material. The support substrate 2 may include Ni (nickel). More specifically, the support substrate 2 may contain Ni—$Y_2O_3$ (nickel yttria) as a main component. The nickel may be included as an oxide (NiO), and NiO may be reduced to Ni by hydrogen gas during power generation. The support substrate 2 may include components other than Ni-containing materials, and for example, may contain Fe (iron) or $Fe_2O_3$.

In the present specification, the term "contain as a main component" means that the content of that component is at least 50 wt %, or is at least 60 wt %, or is at least 80 wt %, or is at least 90 wt %. Furthermore, the term "contain as a main component" could be the configuration in which only that component is present.

As illustrated in FIG. 1 and FIG. 2, a gas flow channel 21 is formed inside the support substrate 2. The gas flow channel 21 extends along the longitudinal direction (z axis direction) of the support substrate 2. During power generation, fuel gas flows into the gas flow channel 21 and fuel gas is supplied to the anode 3 through the pores in the support substrate 2.

The anode 3 is formed on the support substrate 2, and functions as an anode. The anode 3 includes NiO and $CaZrO_3$ (abbreviated to CZO below). The anode 3 may contain NiO and CZO as a main component. The NiO may be reduced to Ni by hydrogen gas during power generation.

The molar ratio of Ca to Zr in the anode 3 is preferably greater than 1.00, and is non-stoichiometric. Thus, the density of the interconnector 7 can increase. In particular, the molar ratio of Ca to Zr is preferably greater than or equal to 1.04, and still more preferably less than 1.20. In this manner, a reduction in the electrical resistance at the interface of the interconnector 7 can be realized.

Furthermore, the amount of Ni in the anode 3 is preferably greater than or equal to 51.4 atom %. In this manner, a reduction in the electrical resistance at the interface of the interconnector 7 can also be realized.

The anode 3 may be divided into two layers formed by the anode active layer that includes fine-grained NiO and a porous anode current collecting layer containing NiO and CZO that exhibit superior gas permeation. The anode active layer is provided between the electrolyte layer 4 and the anode current collecting layer. The anode active layer has the function of promoting electrode reactions on the anode 3 side, and inhibiting electrode reaction resistance to a low level.

As illustrated in FIG. 2, the electrolyte layer 4 of the first cell 10 is covered the entire surface other than the second cell-side end of the anode 3. The electrolyte layer 4 of the second cell 11 is formed from the first cell-side end of the anode 3 to the interconnector 7 of the first cell 10. In this manner, the electrolyte layer 4 of the second cell 11 covers the exposed portion from the anode 3 of the first and second cells 10 and 11 on the support substrate 2.

The electrolyte layer 4 may include zirconia as a main component. The electrolyte layer 4 for example may be a fired body of a zirconia-based material such as yttria-stabilized zirconia such as 3YSZ or 8YSZ, or ScSZ (scandia-stablized zirconia).

The barrier layer 5 is provided on the electrolyte layer 4. In FIG. 2, the barrier layer 5 is not provided at a position at which the electrolyte layer 4 is omitted. That is to say, one barrier layer 5 is provided to correspond with one anode. Therefore a plurality of electrolyte layers 4 is provided on a single support substrate 2 to extend along the longitudinal direction (z axis direction) of the support substrate 2.

The barrier layer 5 may include ceria (cerium oxide) as a main component. More specifically, the barrier layer 5 may include ceria or a ceria-based material including a rare earth metal forming a solid solution with ceria. More specifically, the material includes GDC ((Ce, Gd)$O_2$: gadolinium doped ceria), SDC ((Ce, Sm)$O_2$: samarium doped ceria), and the like.

The cathode 6 is disposed on the barrier layer 5 without projecting from the outer edge of the barrier layer 5. That is to say, one cathode 6 is provided to correspond to one anode. Therefore, a plurality of cathodes 6 is provided on a single support substrate 2 along the longitudinal direction (z axis direction) of the support substrate 2.

The cathode 6 for example may include a perovskite complex oxide containing lanthanum as a main component. More specifically, the perovskite complex oxide containing lanthanum includes LSCF (lanthanum strontium cobalt ferrite), lanthanum manganite, lanthanum cobaltite, and lanthanum ferrite. Furthermore, the perovskite complex oxide containing lanthanum may be doped with strontium, calcium, chrome, cobalt, iron, nickel, aluminum, and the like.

As illustrated in FIG. 2, the interconnector 7 of the first cell 10 is disposed on the anode 3 of the first cell 10. The interconnector 7 of the first cell 10 is connected to the electrolyte layers 4 of the respective first and second cells 10 and 11. In this manner, the anode 3 of the first cell 10 and the current collector 8 of the second cell 11 are connected by the interconnector 7 to thereby provide an electrical connection between the first and the second cells 10 and 11.

The interconnector 7 includes LaCaCrO$_3$ (abbreviated to "LCC" below). More specifically, LCC is a material expressed by the general formula La$_{1-X}$Ca$_X$Cr$_{1-Y-Z}$A$_Y$O$_3$ (wherein A is any one element selected from the group consisting of Ti, V, Mn, Fe, Co, Cu, Ni, Zn, Mg and Al, $0.025 \leq X \leq 0.3$, $0 \leq Y \leq 0.22$, $0 \leq Z \leq 0.15$). The interconnector 7 may contain LCC as a main component. The interconnector 7 is a dense layer when compared with the support substrate 2 and the anode 3. Furthermore, for the sake of enhancing the connection characteristics between the interconnector 7 and the anode 3, an interlayer may be formed at the interface of these layers.

The film thickness of the interconnector 7 is preferably less than or equal to 98 micrometers. In this manner, the electrical resistance at the interface of the anode 3 can be reduced.

The current collector 8 is disposed to provide an electrical connection between the interconnector 7 of the first cell 10 and the second cell 11. More specifically, the current collector 8 connects the cathode 6 of the second cell 11 with the interconnector 7 of the first cell 10.

The specific dimensions of each component of the fuel cell 1 may be set as shown below.
  Width D1 of support substrate 2: 1 to 10 cm
  Thickness D2 of support substrate 2: 1 to 10 mm
  Length D3 of support substrate 2: 5 to 50 cm
  Distance D4 from outer surface of support substrate 2 (interface between support substrate 2 and anode) to gas flow channel 21: 0.1-4 mm
  Thickness of Anode 3: 50-550 micrometers
  Thickness of electrolyte layer 4: 3-50 micrometers
  Thickness of barrier layer 5: 3-50 micrometers
  Thickness of cathode 6: 10-100 micrometers
  Thickness of interconnector 7: 10-100 micrometers
  Thickness of current collector 8: 50-500 micrometers However, the present invention is not limited to these numerical values.

Method of Manufacturing Fuel Cell 1

Next, an example of a method of manufacturing the fuel cell 1 will be described.

Firstly, the material of the support substrate 2 is formed by an extrusion molding apparatus and dried.

Next, the anode material is prepared. More specifically, firstly, CaCO$_3$ and ZrO$_2$ are weighed. At this time, the molar ratio of CaCO$_3$ to ZrO$_2$ is adjusted so that the molar ratio of Ca to Zr in the anode 3 is a predetermined value greater than 1.0. Next, CZO is synthesized by thermal treatments (1600 degrees C., 10 hrs) of CaCO$_3$ and ZrO$_2$ mixed using a mortar or a pot. At this time, CZO may be configured by incorporating Ca added in excess into a CZO perovskite structure, or a two-phase composite material of CZO/CaO may be configured by forming CaO using Ca added in excess.

Then, after the temperature decreases, the particle diameter of CZO is adjusted by grinding using a mortar or a pot mill. NiO and CZO are weighed so that when NiO is reduced, Ni:CZO is 40 vol %:60 vol %. Then, NiO and CZO are mixed using a mortar or a pot mill, and the particle size is adjusted using a sieve (for example, a stainless steel sieve with a mesh of 150 micrometers).

Next, the anode material (NiO/CZO) is screen printed onto the support substrate surface.

After dip formation of the electrolyte material on the surface of the anode material, LCC material for the interconnector is screen printed and dried.

Next, the support substrate, the anode material (NiO/CZO), the electrolyte material and the interconnector material (LCC) are co-fired. At this time, the molar ratio of Ca to Zr in CZO is adjusted to be greater than 1.0, and therefore, diffusion of Ca from LCC into the anode can be suppressed. In this manner, since the Ca in the LCC has the effective function as a sintering agent, the density of the interconnector 7 can be improved.

Next, the cathode material is coated onto the electrolyte material formed by co-firing, and dried.

Next, the cathode material is fired.

Other Embodiments (A) In the above embodiment, an example of a segmented-in-series configuration was described in relation to the fuel cell. That is to say, at least two cells are provided on a single support substrate 2 in the fuel cell 1. The interconnector 7 is disposed to configure an electrical connection between two cells provided on a single support substrate 2.

However, the present invention is not limited to a segmented-in-series configuration, and may be applied to various types of SOFCs such as vertically-striped, flat, cylindrical configurations or the like. A vertically-striped SOFC will be described below in a simple manner. The vertically-striped SOFC may include at least two fuel cells that include an anode current collecting layer, an anode active layer, a cathode, and an electrolyte layer. The at least two cells are stacked with reference to the thickness direction of the anode current collecting layer. In this configuration, the interconnector is disposed to form an electrical connection between power generating elements that are adjacent with reference to the thickness direction. In this case, layers that are the same function as the current collector 8 may be provided in addition to the interconnector as required.

(B) The present invention may also be applied to a fuel cell having an anode support configuration. More specifically, the fuel cell may include an anode current collecting layer as a support substrate. The anode active layer and other constituent elements are disposed on the anode current collecting layer. The anode current collecting layer that functions as a support substrate has a relatively large thickness in comparison with other layers. The thickness of the anode current collecting layer is not limited to a specific numerical value, and the dimensions of the support substrate as described above may be applied.

EXAMPLES

Manufacture of Samples No. 1 to 38

Samples No. 1 to 38 were prepared as described below. However, in the present embodiment, a co-sintered body of the anode and the interconnector was prepared.

Firstly, the anode material was prepared. More specifically, firstly, $CaCO_3$ and $ZrO_2$ were weighed so that the molar ratio of Ca to Zr in the anode will be different values. CZO was synthesized by thermal treatments (1600 degrees C., 10 hrs) of $CaCO_3$ and $ZrO_2$ mixed using a mortar. Then, after the temperature decreases, the particle diameter of CZO was adjusted by grinding using the mortar. NiO and CZO were weighed so that the ratio NiO to CZO will be different values. Then, NiO and CZO were mixed using a mortar, and the particle size was adjusted using a stainless steel sieve with a mesh of 150 micrometers. A pore forming agent was added to the NiO and CZO after adjustment of the particle size.

Next, after uniaxial pressing of the anode material (NiO/CZO) at 30 MPa, CIP forming was applied at 100 MPa to prepare a pellet. Thus, the NiO/CZO compacts of different compositions were fabricated.

Then, the LCC paste was screen printed onto the NiO/CZO pellet and dried. At this time, the thickness of the LCC paste was adjusted so that the film thickness of the interconnector coincides with an amount shown in Table 1. As shown in Table 1, the film thickness of the interconnector was particularly large in samples No. 32 to 38.

Next, the LCC paste and the NiO/CZO pellet were co-fired (1500 degrees C., 2 hrs). The resulting samples have a disk configuration (pellet) with an overall thickness of 2 mm and a diameter of 15 mm.

Measurement of Density of Interconnector

The density of the interconnector (that is to say, LCC) was calculated for each sample by using an image analysis method. That is to say, image analysis software was used to calculate the pore ratio by use of an SEM photograph of the interconnector. The calculation results for the density of each sample are summarized in Table 1. In Table 1, the evaluation of each sample is "X" when the LCC density of the sample is less than 93% because gas leak will be prevented when the LCC density is greater than or equal to 93%.

Measurement of Electrical Resistance

Figure 3:
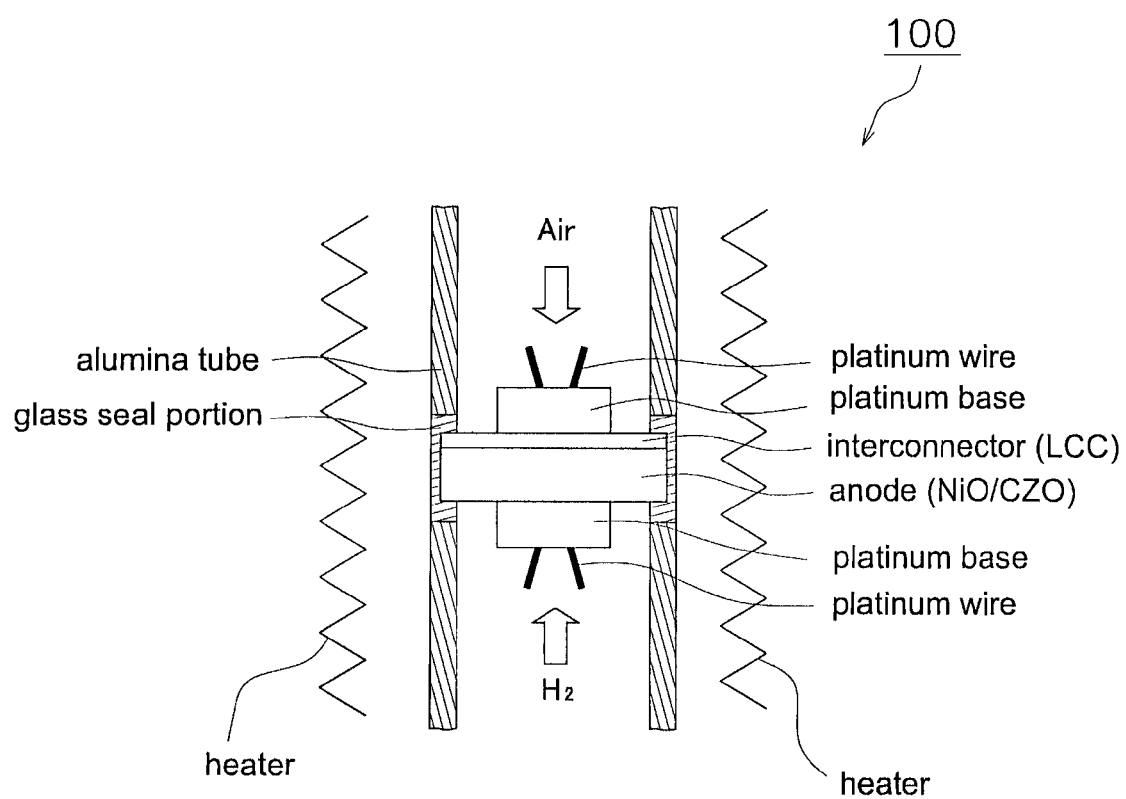
FIG. 3 is a schematic view of the configuration of an electrical-characteristics measurement apparatus.

The electrical resistance of each sample was measured by using an electrical-characteristics measurement apparatus 100 as illustrated in FIG. 3.

More specifically, as illustrated in FIG. 3, each sample was fixed to a glass seal portion provided in an alumina tube and heated with a heater to 800 degrees C. Then, air was introduced into the interconnector side of the alumina tube and hydrogen was introduced into the anode side of the alumina tube. A platinum base is respectively brought into abutment with the interconnector and the anode to thereby apply a fixed current to each sample from two platinum wires (potential line and current line). The voltage value at this time was converted to an area specific resistance to measure the electrical resistance of each sample.

The electrical resistances of each sample are summarized in Table 1. In Table 1, the evaluation of each sample is "⊚" when the density is greater than or equal to 93% and the electrical resistance is less than 10 mΩ·cm², the evaluation of each sample is "○" when the density is greater than or equal to 93% and the electrical resistance is greater than or equal to 10 mΩ·cm². Samples with "○" are available for SOFC because LCC has a sufficient density.

Analysis of Ni Amount (Atom %) in Anode

Scanning electron microscopy-energy dispersive x-ray spectroscopy (SEM-EDS) was used to perform quantitative analysis of the Ni amount (atom %). Three arbitrary regions on a sectional surface of the anode were analyzed in the condition that the vapor-deposited material, oxygen and carbon were not considered so as to quantify the Ni amount accurately. The analysis results are summarized in Table 1.

Analysis of Molar Ratio of Ca to Zr in Anode

SEM-EDS was used to perform quantitative analysis of the Ca amount and the Zr amount (atom %) in three arbitrary regions on a sectional surface of the anode. The calculated molar ratio of Ca to Zr based on the analysis results are summarized in Table 1.

Analysis of Ca Amount (Atom %) in Interconnector

SEM-EDS was used to perform quantitative analysis of the Ca amount (atom %) in three arbitrary regions on a sectional surface of the interconnector. The target elements of the analysis were Ca, La and Cr. The analysis results are summarized in Table 1.

Measurement of Pore Ratio of Anode

A SEM image of a sectional surface of the anode was analyzed to measure the pore ratio. The measurement results are summarized in Table 1.

The pore ratio in the anode is controlled by adjusting the particle diameter or the amount of the pore forming agent that is added to the material for the anode. Furthermore, the pore ratio of the anode is expressed by the ratio of the cavity volume V2 to the total volume V1 (V2/V1). However, V2/V1 can approximate the occupied surface area of the pores in a sectional surface of the anode. The method of estimating a three dimensional structure from a two dimensional structure is disclosed in "Ceramic Processing", Nobuyasu Mizutani, Yoshiharu Ozaki, Toshio Kimura, and Takashi Yamaguchi, Gihodo Shuppan Co., Ltd, Mar. 25, 1985, page 190 to page 201.

Examination of Heterogeneous Phase Component on Surface of Interconnector

The surface of the interconnector was zoomed with the stereoscopic microscope, and whether a heterogeneous phase constructed of materials containing Ca is deposited on the surface of the interconnector or not was examined. Further, as for samples with the heterogeneous phase, the occupied surface area of the heterogeneous phase to total surface of the interconnector was measured by image processing. The observations and the percentage of the heterogeneous phase are summarized in Table 1.

diffuse into the anode side from LCC. Therefore, it is preferred that the molar ratio of Ca to Zr is greater than or equal to 1.04.

In samples No. 7, 14, 15, 22, 23, 30, 38 in which the molar ratio of Ca to Zr is greater than or equal to 1.20, the electrical resistance increases in comparison to other samples. This is due to the fact that Ca added in excess is deposited on LCC surface as highly-resistive heterogeneous phase. Therefore, it is preferred that the molar ratio of Ca to Zr is less than 1.20.

TABLE 1

|  | Ni Amount (vol %) | Ni Amount in Anode (atom %) | Ca Amount in LCC (atom %) | IC Film Thickness (μm) | Pore ratio of reduced body | Molar ratio of Ca to Zr | IC Density (%) | Electrical Resistance (mΩ · cm2) | heterogeneous phase on Surface | Out-of-phase Area (%) | Evaluation |
|---|---|---|---|---|---|---|---|---|---|---|---|
| Sample No. 1 | 40 | 64.4 | 8 | 28 | 41.3 | 1.02 | 93 | 16.5 | No | — | ◯ |
| Sample No. 2 | 40 | 64.2 | 8.7 | 42 | 37.3 | 1.04 | 95 | 4.5 | No | — | ◎ |
| Sample No. 3 | 40 | 63.6 | 9.5 | 54 | 51.3 | 1.09 | 98 | 3.4 | No | — | ◎ |
| Sample No. 4 | 40 | 63.3 | 10.3 | 63 | 48.3 | 1.11 | 99 | 1.9 | No | — | ◎ |
| Sample No. 5 | 40 | 63.0 | 11 | 53 | 37.0 | 1.14 | 99 | 2.0 | No | — | ◎ |
| Sample No. 6 | 40 | 62.6 | 11.5 | 29 | 29.3 | 1.17 | 99 | 3.3 | No | — | ◎ |
| Sample No. 7 | 40 | 62.2 | 12.4 | 33 | 42.3 | 1.20 | 99 | 26.1 | Yes | 25 | ◯ |
| Sample No. 8 | 40 | 64.7 | 7.8 | 60 | 41.0 | 1.00 | 91 | 36.8 | No | — | X |
| Sample No. 9 | 30 | 53.6 | 8.3 | 24 | 47.3 | 1.03 | 93 | 15.7 | No | — | ◎ |
| Sample No. 10 | 30 | 53.0 | 8.9 | 41 | 21.6 | 1.07 | 95 | 3.8 | No | — | ◎ |
| Sample No. 11 | 30 | 52.7 | 9.9 | 4 | 49.1 | 1.11 | 97 | 4.1 | No | — | ◎ |
| Sample No. 12 | 30 | 52.3 | 11 | 14 | 34.5 | 1.15 | 98 | 2.3 | No | — | ◎ |
| Sample No. 13 | 30 | 51.7 | 11.3 | 24 | 33.4 | 1.19 | 98 | 2.1 | No | — | ◎ |
| Sample No. 14 | 30 | 51.4 | 11.8 | 5 | 41.9 | 1.23 | 99 | 33.5 | Yes | 35 | ◯ |
| Sample No. 15 | 30 | 51.1 | 12 | 21 | 34.3 | 1.25 | 99 | 34.5 | Yes | 36 | ◯ |
| Sample No. 16 | 30 | 54.1 | 7.8 | 15 | 45.4 | 1.00 | 91 | 33.7 | No | — | X |
| Sample No. 17 | 20 | 40.3 | 8.2 | 78 | 44.2 | 1.03 | 94 | 47.6 | No | — | ◯ |
| Sample No. 18 | 20 | 39.9 | 8.8 | 90 | 47.1 | 1.07 | 99 | 44.3 | No | — | ◯ |
| Sample No. 19 | 20 | 39.3 | 9.2 | 50 | 42.4 | 1.11 | 99 | 52.4 | No | — | ◯ |
| Sample No. 20 | 20 | 39.0 | 9.5 | 31 | 34.2 | 1.15 | 99 | 51.3 | No | — | ◯ |
| Sample No. 21 | 20 | 38.6 | 10.3 | 45 | 39.2 | 1.19 | 99 | 50.1 | No | — | ◯ |
| Sample No. 22 | 20 | 38.1 | 10.9 | 66 | 40.3 | 1.23 | 99 | 53.7 | Yes | 31 | ◯ |
| Sample No. 23 | 20 | 37.9 | 11.2 | 58 | 46.1 | 1.25 | 99 | 46.6 | Yes | 37 | ◯ |
| Sample No. 24 | 20 | 40.7 | 7.7 | 48 | 42.1 | 1.00 | 92 | 55.3 | No | — | X |
| Sample No. 25 | 55 | 76.7 | 9 | 46 | 25.4 | 1.04 | 94 | 4.8 | No | — | ◎ |
| Sample No. 26 | 55 | 76.2 | 9.7 | 91 | 25.4 | 1.09 | 95 | 4.1 | No | — | ◎ |
| Sample No. 27 | 55 | 76.1 | 10 | 87 | 42.1 | 1.11 | 95 | 3.8 | No | — | ◎ |
| Sample No. 28 | 55 | 75.8 | 10.7 | 90 | 51.3 | 1.14 | 97 | 3.9 | No | — | ◎ |
| Sample No. 29 | 55 | 75.4 | 11.5 | 78 | 48.1 | 1.17 | 97 | 3.4 | No | — | ◎ |
| Sample No. 30 | 55 | 75.1 | 12 | 98 | 38.5 | 1.20 | 98 | 37.4 | Yes | 40 | ◯ |
| Sample No. 31 | 55 | 77.0 | 7.7 | 53 | 37.5 | 1.00 | 88 | 39.5 | No | — | X |
| Sample No. 32 | 40 | 64.3 | 8.1 | 110 | 43.4 | 1.02 | 98 | 21.4 | No | — | ◯ |
| Sample No. 33 | 40 | 64.2 | 8.9 | 132 | 35.8 | 1.04 | 99 | 20.8 | No | — | ◯ |
| Sample No. 34 | 40 | 63.7 | 9.5 | 130 | 30.7 | 1.09 | 99 | 25.3 | No | — | ◯ |
| Sample No. 35 | 40 | 63.4 | 10.1 | 167 | 42.7 | 1.11 | 99 | 43.4 | No | — | ◯ |
| Sample No. 36 | 40 | 63.0 | 10.9 | 135 | 49.0 | 1.14 | 99 | 27.3 | No | — | ◯ |
| Sample No. 37 | 40 | 62.5 | 11.4 | 143 | 43.1 | 1.17 | 99 | 28.9 | No | — | ◯ |
| Sample No. 38 | 40 | 62.4 | 11.9 | 152 | 29.6 | 1.20 | 99 | 42.3 | Yes | 20 | ◯ |

As illustrated in Table 1, LCC has a sufficient density in samples (that is to say, in samples other than samples No. 8, 16, 24, 31) in which the molar ratio of Ca to Zr is greater than 1.00. This is due to the fact that diffusion of Ca in the LCC into the anode is inhibited due to the non-stoichiometric molar ratio of Ca to Zr in CZO.

In samples No. 1, 9, 17, 32 in which the molar ratio of Ca to Zr is less than 1.04, the electrical resistance increases in comparison to other samples in which the interconnector thickness and the Ni amount (atom %) of the anode exhibit the same conditions. This is due to the fact that Ca forming a solid solution with NiO is supplied from anode current collecting layer not LCC. That is to say, this is due to the fact that it is hard for Ca included as a sintering agent in LCC to There is a tendency for the electrical resistance to increase in samples No. 17 to 23 in which the Ni amount of the anode is less than 51.4 atom %. If the Ni amount is small, Ni-to-Ni electric connection is broken and the anode becomes highly-resistive because electric conducting property of the anode is ensured by Ni-to-Ni electric connection. Therefore, it is preferred that the Ni amount in the anode is greater than or equal to 51.4%.

Samples No. 32 to 38 in which the interconnector thickness is greater than 98 micrometers exhibit a tendency for the electrical resistance to increase. If the LCC is thick, the electric resistance of the co-sintered body increases because the electric resistance of LCC has maximum resistance in components of the co-sintered. Therefore it is preferred that the interconnector thickness is less than or equal to 98 micrometers. The electric resistance of LCC is about 10 to 100 times greater than that of general anode.

What is claimed is:

1. A solid oxide fuel cell comprising:
a first cell and a second cell respectively including an anode containing NiO and calcium zirconate, a cathode, a solid electrolyte layer disposed between the anode and the cathode, and a current collector disposed on the cathode; and
an interconnector connected directly to the anode of the first cell and the current collector of the second cell, the interconnector containing $LaCaCrO_3$,
a molar ratio of Ca to Zr in the calcium zirconate being greater than 1.0.

2. The solid oxide fuel cell according to claim 1, wherein the molar ratio of Ca to Zr in the calcium zirconate is greater than or equal to 1.04.

3. The solid oxide fuel cell according to claim 1, wherein the molar ratio of Ca to Zr in the calcium zirconate is less than 1.20.

4. The solid oxide fuel cell according to claim 1, wherein a Ni amount in the anode is greater than or equal to 51.4 atom %.

5. The solid oxide fuel cell according to claim 1, wherein a film thickness of the interconnector is less than or equal to 98 micrometers.

6. The solid oxide fuel cell according to claim 2, wherein the molar ratio of Ca to Zr in the calcium zirconate is less than 1.20.

7. The solid oxide fuel cell according to claim 2, wherein a Ni amount in the anode is greater than or equal to 51.4 atom %.

8. The solid oxide fuel cell according to claim 3, wherein a Ni amount in the anode is greater than or equal to 51.4 atom %.

9. The solid oxide fuel cell according to claim 6, wherein a Ni amount in the anode is greater than or equal to 51.4 atom %.

10. The solid oxide fuel cell according to claim 2, wherein a film thickness of the interconnector is less than or equal to 98 micrometers.

11. The solid oxide fuel cell according to claim 3, wherein a film thickness of the interconnector is less than or equal to 98 micrometers.

12. The solid oxide fuel cell according to claim 4, wherein a film thickness of the interconnector is less than or equal to 98 micrometers.

13. The solid oxide fuel cell according to claim 6, wherein a film thickness of the interconnector is less than or equal to 98 micrometers.

14. The solid oxide fuel cell according to claim 9, wherein a film thickness of the interconnector is less than or equal to 98 micrometers.

15. The solid oxide fuel cell according to claim 1, wherein the interconnector contains at least 50% by weight of $LaCaCrO_3$.

16. The solid oxide fuel cell according to claim 1, wherein the anode contains an anode material comprising a mixture of NiO and the calcium zirconate.

* * * * *